(12) United States Patent
Iwamura (10) Patent No.: US 7,606,426 B1
(45) Date of Patent: Oct. 20, 2009

(54) IMAGE PROCESSING APPARATUS AND METHOD AND STORAGE MEDIUM

(75) Inventor: Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 829 days.

(21) Appl. No.: 09/660,444

(22) Filed: Sep. 12, 2000

(30) Foreign Application Priority Data

Sep. 30, 1999 (JP) ................... 11-279983
May 16, 2000 (JP) ................ 2000-143208

(51) Int. Cl.
*G06K 9/36* (2006.01)
*G06K 9/46* (2006.01)

(52) U.S. Cl. ...................... 382/232; 382/100

(58) Field of Classification Search ................. 382/100, 382/232–253; 380/207, 216, 217; 713/167, 713/176; 300/207, 216–217
See application file for complete search history.

(56) References Cited

U.S. PATENT DOCUMENTS

| | | | |
|---|---|---|---|
| 5,600,720 A | 2/1997 | Iwamura et al. | 380/1 |
| 5,666,419 A | 9/1997 | Yamamoto et al. | 380/28 |
| 5,937,395 A | 8/1999 | Iwamura | 705/30 |
| 6,088,454 A | 7/2000 | Nagashima et al. | 380/49 |
| 6,192,138 B1* | 2/2001 | Yamadaji | 382/100 |
| 6,275,599 B1* | 8/2001 | Adler et al. | 382/100 |
| 6,285,775 B1* | 9/2001 | Wu et al. | 382/100 |
| 6,332,030 B1* | 12/2001 | Manjunath et al. | 382/100 |
| 6,473,516 B1* | 10/2002 | Kawaguchi et al. | 382/100 |
| 6,571,020 B1* | 5/2003 | Dumoulin et al. | 382/254 |
| 6,574,350 B1* | 6/2003 | Rhoads et al. | 382/100 |
| 7,031,531 B1* | 4/2006 | Saiga et al. | 382/232 |
| 7,164,369 B2* | 1/2007 | Gaebel et al. | 341/50 |

OTHER PUBLICATIONS

Kankanhalli et al., "Adaptive Visible Watermarking of Images", IEEE International Conference on Multimedia Computing and Systems 1999, Jun. 7-11, 1999, vol. 1, pp. 568-573.*

* cited by examiner

*Primary Examiner*—Wesley Tucker
(74) *Attorney, Agent, or Firm*—Fitzpatrick, Cella, Harper & Scinto (57) ABSTRACT

In an embedding technique of an invisible or visible digital watermark information, it is a main object to provide a technique which can reconstruct an original image and avoid an increase of the whole image data due to holding of key information or the like. To accomplish this object, an image processing apparatus of the invention is constructed by, an input unit for inputting image data showing an original image, a compressing unit for compressing at least a part of the image data, and an embedding unit for embedding compression data obtained by the compressing unit into the image data so that it is difficult to be identified by the human eyes by converting a part of the image data.

9 Claims, 9 Drawing Sheets

PRIOR ART

IMAGE PROCESSING APPARATUS AND METHOD AND STORAGE MEDIUM

BACKGROUND OF THE INVENTION

1. Field of the Invention

The invention relates to image processing apparatus and method for processing digital image data and, more particularly, to image processing apparatus and method for performing protection of a copyright, prevention of alteration of an image, a recording of various information, or the like by embedding a digital watermark into digital image data and to a storage medium for realizing such a method.

2. Related Background Art

In recent years, an image is often handled as digital data (digital image data). The digital image data is easily copied by using a computer or the like or easily transmitted through a communication line without deteriorating a picture quality.

Therefore, there is a fear that the digital image data is easily illegally copied and redistributed. A digital watermark technique has been known as a method of suppressing those operations.

The digital watermark technique is mainly classified into: an invisible digital watermark technique for embedding watermark information such as copyright information, user information, or the like in a form such that it is difficult to be identified by the human eyes; and a visible digital watermark technique for forming a watermark image such as a logo or the like of a company which possesses a copyright of an image onto the image in a form such that it can be identified by the human eyes.

When digital watermark information is embedded in an image by the invisible digital watermark technique, whether the watermark information has been embedded or not cannot be identified if the watermark-embedded image is merely seen. Therefore, although it is difficult to delete the watermark information, an illegal copy or an illegal distribution can be easily performed as compared with the visible digital watermark technique.

Even if the digital image data is illegally copied or distributed, since a possibility that the watermark information remains in the digital image data is high, the illegal user can be specified by extracting a user ID or the like embedded as digital watermark information.

To extract the embedded digital watermark information, information showing at which position in the image the digital watermark information has been embedded or associated information (in the case where the embedding position has been determined in a random number manner, an initial value for generating the random numbers, or the like) of such information has to be secretly held by a specific apparatus or person as "key" information for extraction of the digital watermark information.

As representative methods for the invisible digital watermark, there is known a method of performing a frequency conversion such as high speed Fourier transformation, discrete cosine transformation, wavelet transformation, or the like to an input image and embedding a digital watermark into a certain frequency area, a method of directly embedding it into a space area (this method is called a patchwork), or the like. A method of embedding information into a lower bit (for example, least significant bit) showing each pixel value in an image is also known.

Generally, the invisible digital watermark can be used as it is with a value similar to the original image. The information embedded to pursue the illegal use is difficult to be removed from the image. An embedding process of the invisible digital watermark information, therefore, can be regarded as an irreversible image process.

In the case where digital watermark information is embedded in the image by the visible digital watermark technique, the digital watermark information has been embedded onto the digital image in a form such that it is visible by the eyes and it is difficult to use it as it is with a value similar to the original image. Therefore, the act such as illegal copy or illegal distribution can be suppressed.

Figure 1:
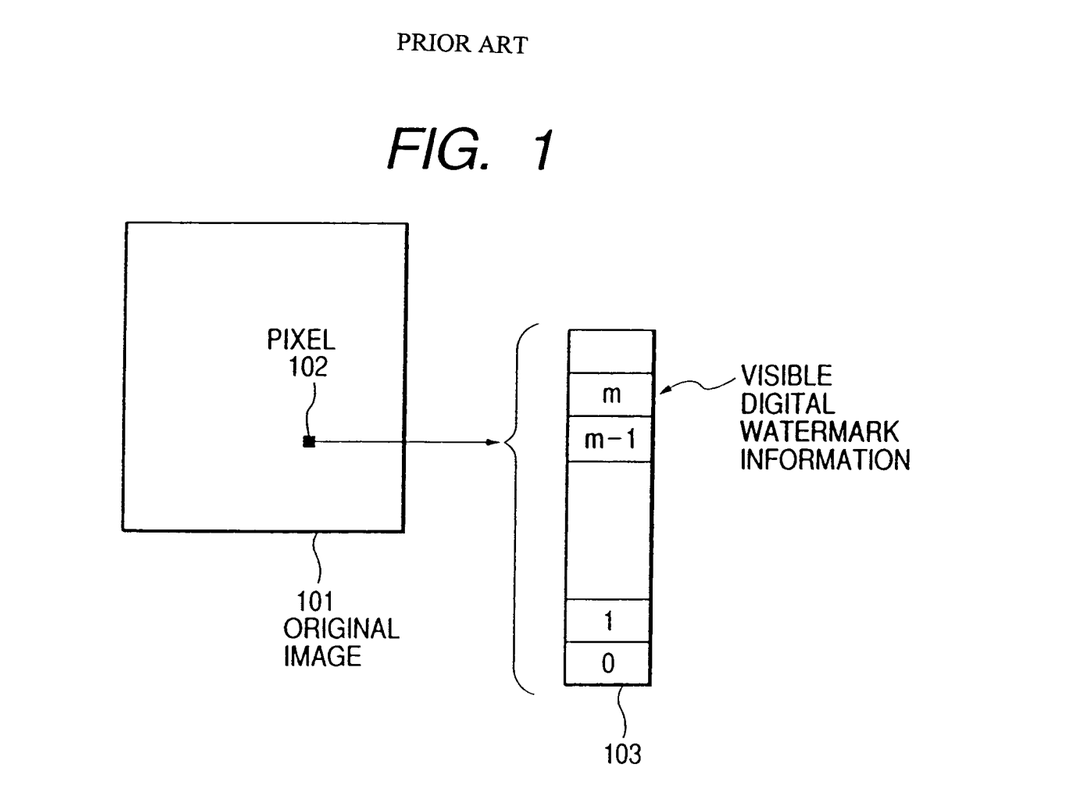
FIG. 1 is a diagram showing an example of an embedding method of embedding visible digital watermark information into an original image.

As a visible type embedding method of the digital watermark information, there is a method whereby each pixel value of an image showing a logo or the like of the copyright owner is exchanged to a value of the m-th bit of a pixel value in a designated area in an original image, thereby embedding copyright information into the original image. Explanation will be made with reference to FIG. 1. Assuming that the least significant bit of the pixel value is the 0-th bit, the m-th bit corresponds to the bit position of a relatively upper bit (bit position near the most significant bit), namely, corresponds to the bit position which can be identified by the human eyes. In FIG. 1, reference numeral 101 denotes an original image; 102 one arbitrary pixel constructing the image; and 103 a bit construction of a pixel value of the pixel 102.

In the case where the user wants to use such an image in which visible digital watermark information has been embedded as an inherent original image, it is necessary to reconstruct the original image by removing the digital watermark information. For this purpose, for example, the value of the m-th bit of the image (original image) before the exchange is secretly held as key information and, when the image is reconstructed to the original image, the value corresponding to the key information is exchanged again to the pixel value of the image in which the digital watermark information has been embedded.

Generally, as for the visible digital watermark information, it is desirable to realize the reversible conversion as mentioned above. If the user intends to accomplish the reversible conversion, however, for example, in the case where the designated area of the image in which visible digital watermark information is embedded occupies most of the original image, there is a problem such that a data amount of the key information to be separately held is very large.

Figure 2:
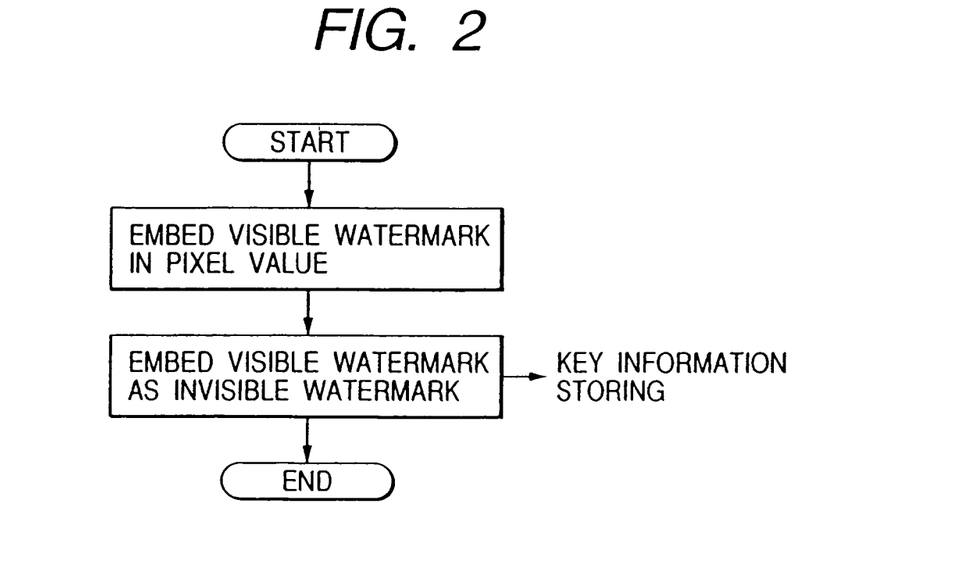
FIG. 2 is a diagram showing an example of solving the problems in the conventional visible watermark technique.

As one of countermeasure methods for the conventional visible digital watermark technique, for example, as shown in FIG. 2, there is a method whereby the key information is embedded as an invisible watermark information into the image and an increase in whole data amount due to the holding of the key information is suppressed. For instance, if the visible watermark key information mentioned above is exchanged to the 0-th bit (the original 0-th bit is deleted), since the 0-th bit is the least significant bit, it is difficult to identify the 0-th bit by the human eyes, the key information can be embedded, and an increase in whole data amount can be also suppressed. If such a method is used, however, the perfect reversible conversion cannot be realized.

Hitherto, if digital watermark information was embedded in an original image by using the invisible digital watermark technique, it is difficult to reconstruct the perfect original image from the image derived after the embedding.

On the other hand, if visible digital watermark information was embedded in an original image, in order to reconstruct the perfect original image from the image derived after the embedding, the key information necessary to remove the digital watermark information is needed and there is a problem that the whole image data amount is increased due to the holding of the key information.

SUMMARY OF THE INVENTION

The invention is made in consideration of the above problems and, in the embedding technique of invisible or visible digital watermark information, it is a main object of the invention to provide a technique which can reconstruct an original image and can avoid an increase in whole image data amount due to the holding of key information, or the like.

To accomplish the above object, according to a preferred aspect of the invention, there is provided an image processing apparatus comprising: an input unit for inputting image data showing an original image; a compressing unit for compressing at least a part of the image data; and an embedding unit for embedding compression data obtained by the compressing unit into the image data so that it is difficult to be identified by the human eyes by converting a part of the image data.

The above and other objects and features of the present invention will become apparent from the following detailed description and the appended claims with reference to the accompanying drawings.

DETAILED DESCRIPTION OF THE PREFERRED EMBODIMENTS

Embodiments suitable for the invention will be sequentially explained hereinbelow.

First Embodiment

A preferred embodiment of the invention will be described in detail hereinbelow with reference to the drawings.

Figure 3:
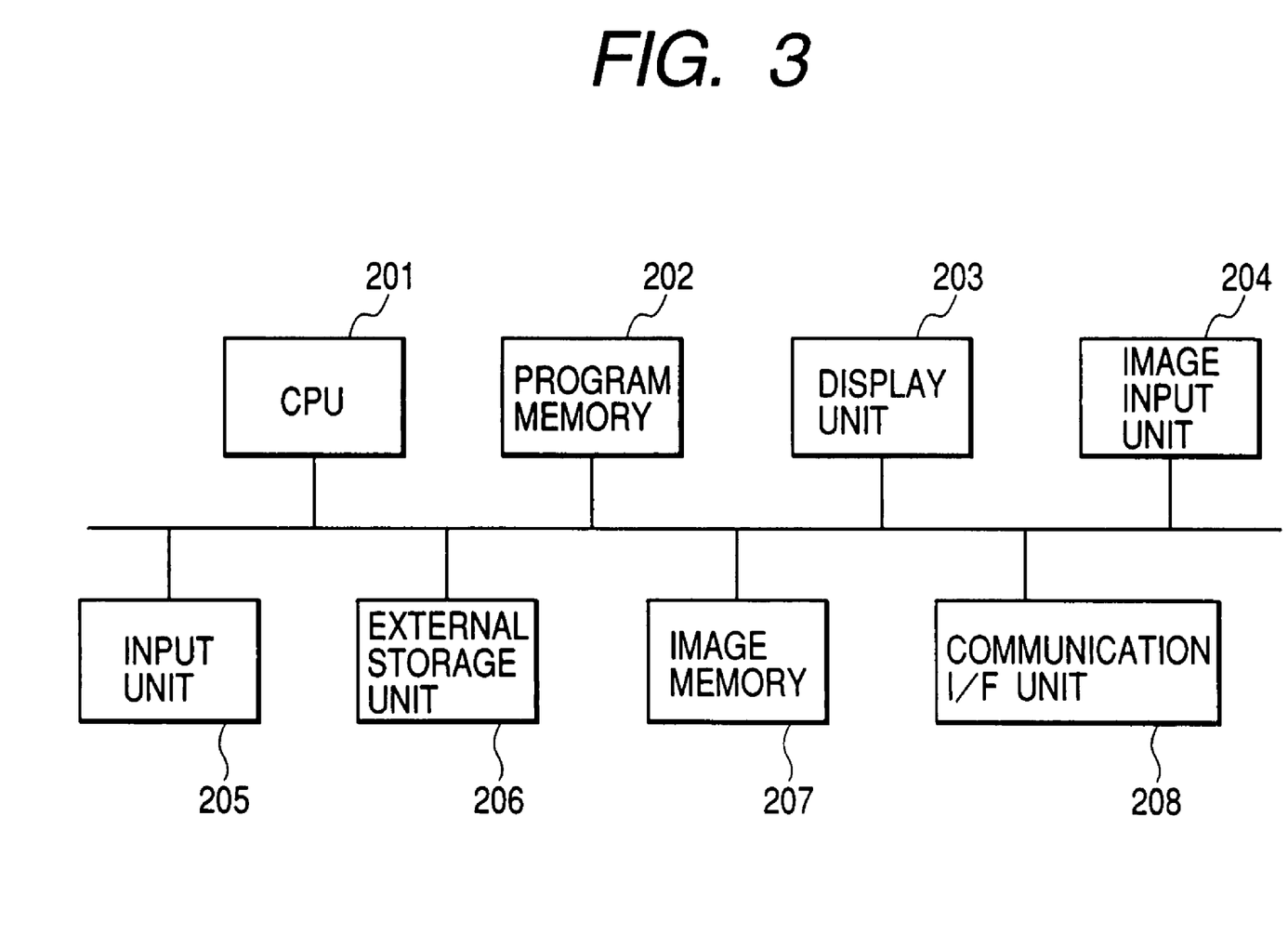
FIG. 3 is a block diagram showing a hardware construction of an image processing apparatus.

FIG. 3 is a block diagram showing a construction of an image processing apparatus according to the embodiment.

Reference numeral 201 denotes a CPU for controlling the operation of the whole apparatus. The CPU 201 is constructed by, for example, a microprocessor or the like and executes various controls in accordance with a control program stored in a program memory 202. Reference numeral 203 denotes a display unit which has, for example, a CRT, a liquid crystal display, or the like and is used to display various images or messages to the operator.

Reference numeral 204 denotes an image input unit constructed by either an image input unit such as scanner, camera, or the like or an interface unit for receiving image data from a communication line or the like and fetching it. Reference numeral 205 denotes an input unit which has, for example, a keyboard, a mouse, or the like and is operated by the operator and used to input various data, commands, or the like to the image processing apparatus. Reference numeral 206 denotes an external storage unit such as hard disk, CD-ROM, MO, or the like which is used to store various image data or digital watermark information.

Various programs have been stored in the external storage unit 206. By loading the programs into the program memory 202, they are executed by the CPU 201 and a control in the apparatus based on the programs is made. Reference numeral 207 denotes an image memory which is used to store the inputted image data or the like; and 208 indicates a communication interface unit connected to another equipment or an output apparatus such as a printer or the like via the LAN, communication line, or the like.

Figure 4:
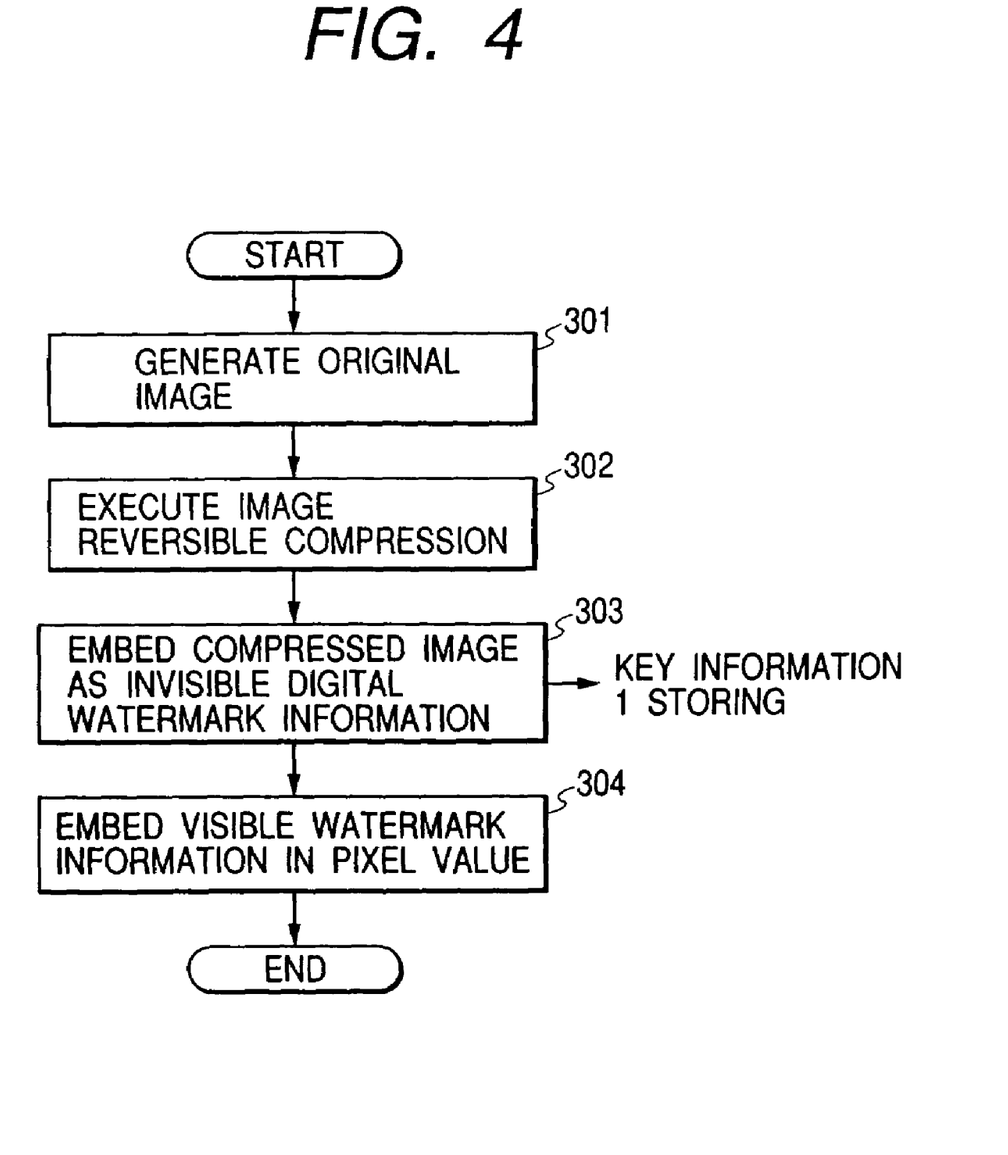
FIG. 4 is a flowchart for explaining an embedding method according to the first embodiment.
Figure 5:
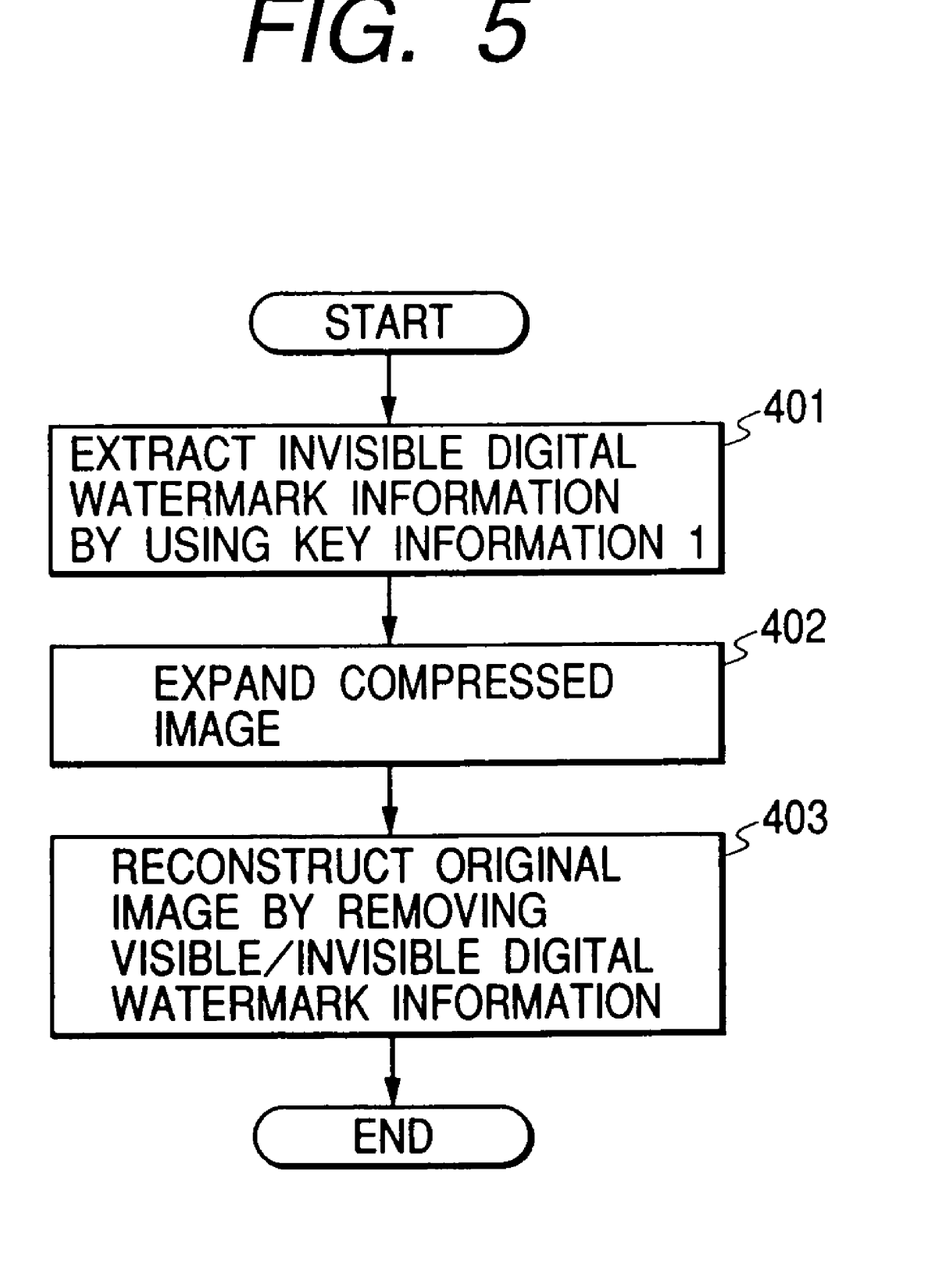
FIG. 5 is a flowchart for explaining an image reconstructing method according to the first embodiment.

FIG. 4 is a flowchart for explaining a digital watermark embedding process which is executed by the image processing apparatus which is applied in the embodiment. FIG. 5 is a flowchart for explaining a reconstructing process of an original image corresponding to the process of FIG. 4.

Figure 10:
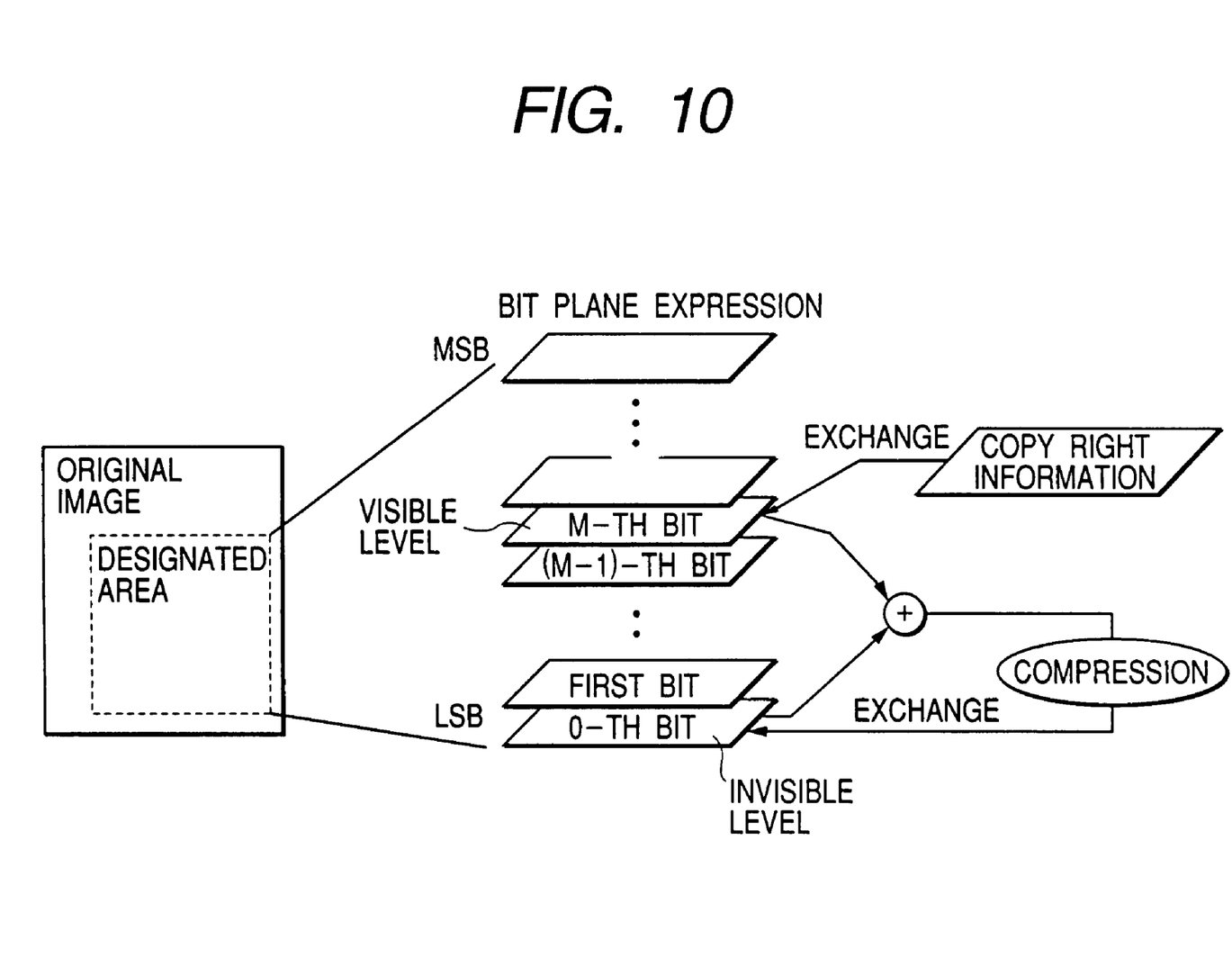
FIG. 10 is a conceptual diagram for explaining the digital watermark information in the first embodiment.

As shown in a conceptual diagram of FIG. 10, the embodiment intends to explain a technique such that with respect to a designated area in an image, data (bit plane) of the m-th bit showing each pixel value in the designated area is exchanged to visible digital watermark information (bit plane) showing copyright information such as a logo or the like, thereby embedding the visible digital watermark information, and data obtained by synthesizing the exchanged data of the m-th bit and the data of the 0-th bit is embedded as invisible digital watermark information into the 0-th bit. Thus, the data amount of the image in which the visible watermark has been embedded can be equalized to that of the original image and the original image can be perfectly reconstructed from the image. Explanation will be made in detail hereinbelow.

In FIG. 4, first in step 301, image data (image data showing the original image) partially including the data (bit plane) of the m-th bit corresponding to the position where the visible digital watermark information should be embedded and the data (bit plane) of the 0-th bit corresponding to the position where the invisible digital watermark information should be embedded is formed.

Subsequently, in step 302, the image data is reversibly compressed. This process is an important feature for reconstructing the perfect original image later. The embodiment will be described on the assumption that the data of the m-th bit and the data of the 0-th bit are compressed. Therefore, the compression image data which is obtained here is compression image data of two bit planes.

In step 303, the compressed image data is embedded as invisible digital watermark information into the 0-th bit (bit plane) of each pixel value in the designated area. The process for embedding it as invisible digital watermark information corresponds to a process of embedding the image data so that it is difficult to be identified by the human eyes. On the other hand, the process for embedding it as visible digital watermark information corresponds to a process of embedding the image data so that it can be identified by the human eyes.

A compression ratio in the reversible compressing process in step 302 needs to be equal to 50% or less in consideration of a point that the data obtained by compressing the image data (bit plane) comprising the m-th bit and the 0-th bit has to be embedded in the bit plane of the 0-th bit corresponding to one of them in step 303.

As a method for such a reversible compression, for example, there is a JPEG-LS method, an LZW (Lempel-Ziv-Welch) method, an arithmetic encoding, or the like. In the embedding of the invisible digital watermark information in step 303, the information showing that "the embedding position is the 0-th bit" becomes key information 1. Finally, in step 304, by exchanging the m-th bit (bit plane) to the visible digital watermark information (bit plane), the visible digital watermark information is embedded into the pixel value in the designated area.

In the reversible compression, there is also a case where the image data comprising the m-th bit and the 0-th bit cannot be reversibly compressed to 50% or less in dependence on the contents of the original image. This is mainly because although the upper bits near the m-th bit can be reversibly compressed at a high compression ratio by using a statistic prediction, the lower bit plane near the 0-th bit cannot be reversibly compressed at a similar high compression ratio. In this case, the bit plane of the m-th bit is preferentially reversibly compressed and the bit plane of the 0-th bit is non-preferentially reversibly compressed, thereby accomplishing the object of the invention. There are, consequently, effects that an outline (upper bits corresponding to the m-th bit) of the image can be perfectly held and the lower bits can be also stored as much as possible.

A process for reconstructing the image in which the digital watermark information has been embedded to the original image will be described with reference to FIG. 5.

In the reconstructing process to the original image, first in step 401, the compression image data as invisible digital watermark information is extracted from the 0-th bit (bit plane) of the pixel value in the designated area by using the key information 1.

In next step 402, the compression image data is decompressed by using an algorithm opposite to that used upon compression, thereby reconstructing the image data (bit plane) of the m-th bit and the 0-th bit for constructing the designated area of the original image. Finally, in step 403, the visible digital watermark information (bit plane) corresponding to the copyright information such as logo or the like embedded in the m-th bit is exchanged to the bit plane of the m-th bit constructing the original image, thereby removing the visible digital watermark information. Further, by exchanging the bit plane of the 0-th bit obtained by the decompression to the compression image data, the invisible digital watermark information is also removed. The perfect original image can be reconstructed by the above processes.

The idea of the invention is not limited to the foregoing case but can be variably applied.

For example, the compression image data to be embedded as invisible digital watermark information into a part of the image can be replaced with image data obtained by reversibly compressing the whole original image. In this case, the whole original image is reversibly compressed in step 302. As a reversible compression, it is sufficient to use a method whereby the image data can be compressed to an amount which is equal to or less than the image data amount as a target in which the compression image data is embedded as invisible digital watermark information.

As a method of embedding the invisible digital watermark information in step 303 and a method of embedding the visible digital watermark information in step 304, arbitrary different methods can be used so long as they do not mutually exert an influence or an influence is very small. In accordance with circumstances, the order of embedding the visible/invisible digital watermark information (processing procedure in steps 303 and 304) can be also exchanged.

An example of an algorithm which can replace the order and is different from that in the embodiment will be simply explained hereinbelow. The invention can be also applied to the following method.

For example, the invention can be applied to the case where a color image constructed by RGB components each consisting of a plurality of bits is the original image. It is assumed that a target in which the visible digital watermark information is embedded is the R component and a target in which the invisible digital watermark information is embedded is the B component.

Specifically speaking, the visible digital watermark information is embedded by exchanging a part of the image data of the R component (bit plane of the m-th bit of the R component) to the image data visually showing the copyright information such as logo or the like. It is assumed that the original image is separated into luminance and chromaticity components and reversibly compressed by the JPEG-LS or the like, thereby forming compression image data of a data amount smaller than the original B component, and this compression image data is embedded into the lower bit plane of the B component as possible.

The embedding method of the invisible digital watermark information, it is not limited to the embedding of the spatial digital watermark information such that the pixel value is exchanged as mentioned above but the invisible digital watermark embedding process can be also realized by embedding the invisible digital watermark information into a frequency component of the image data (B component) serving as a target in which the invisible digital watermark information is embedded.

When considering the fact that all of the information of the original image has been embedded in the B component, the conversion of the image data to embed the visible digital watermark information (logo or the like) can be also performed to the whole R component.

A reconstructing method of the original image corresponding to the embedding of the digital watermark information to the color original image of RGB mentioned above will be described.

In step 401 in FIG. 5, the compression image data embedded as an invisible digital watermark information is extracted from the B image.

In step 402, by decompressing the compression image data, an image similar to the original image constructed by the original RGB components is reconstructed.

Finally, in step 403, the original image is reconstructed by exchanging the whole data equivalent to the original image obtained by the decompression to the whole image data in which the visible digital watermark information has been embedded in the R component.

Since the reconstruction of the original image is realized by exchanging the whole data equivalent to the original image obtained by the decompression to the image in which the digital watermark information has been embedded, the original image can be certainly reconstructed by an arbitrary method irrespective of the visible digital watermark embedding method so long as the invisible digital watermark information (compression image data) can be correctly extracted.

Second Embodiment

In the first embodiment, the embedding method of the visible digital watermark information in which the increase in whole data amount due to the holding of the key information can be avoided and the perfect reversibility can be realized has been described.

However, the safety of the first embodiment depends on the safety of the invisible digital watermark information. For example, if a person (hereinafter, referred to as an attacker) who intends to illegally use an image has found out the fact that the compression image data was embedded in the 0-th bit, the attacker can extract the compression image data from the 0-th bit and decompress only the compression image data since many compressing methods have generally been published. If the decompressed image is the original image, the attacker can easily obtain the original image.

In the embodiment, accordingly, a method whereby the safety is improved lest the original image is illegally reconstructed as compared with the first embodiment will be described.

Figure 6:
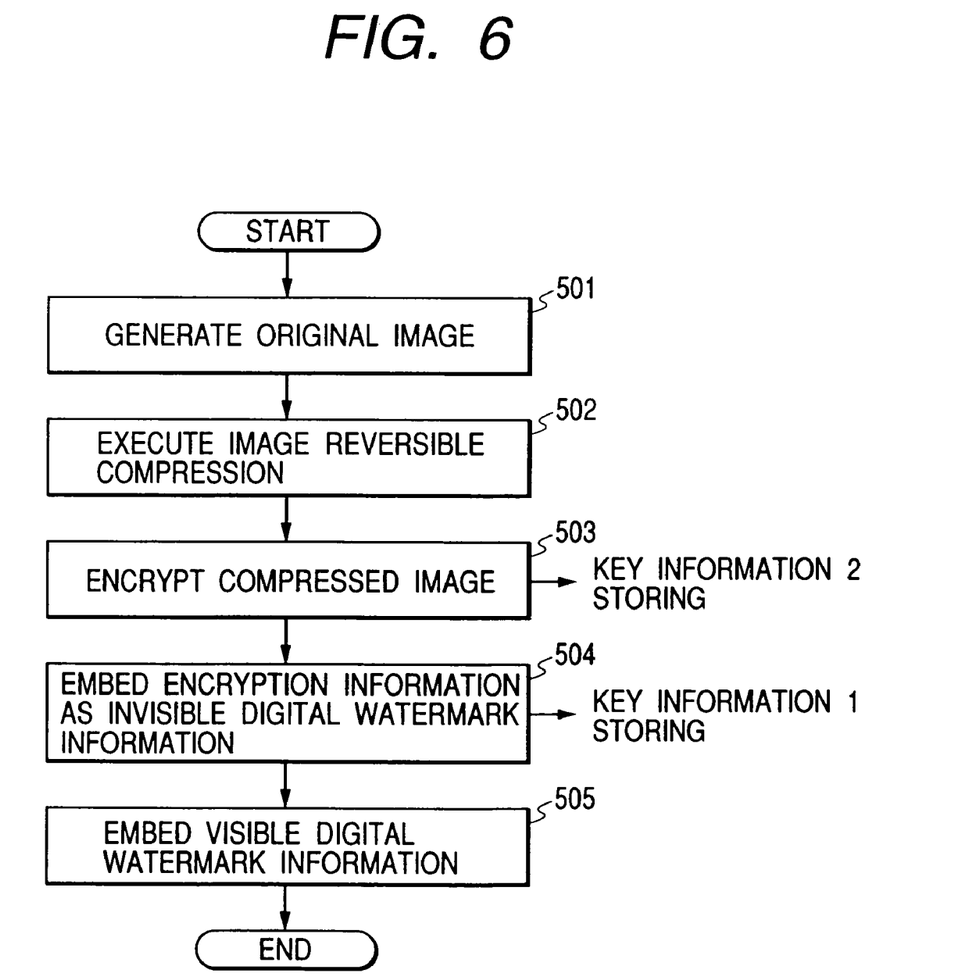
FIG. 6 is a flowchart for explaining an embedding method according to the second embodiment.
Figure 7:
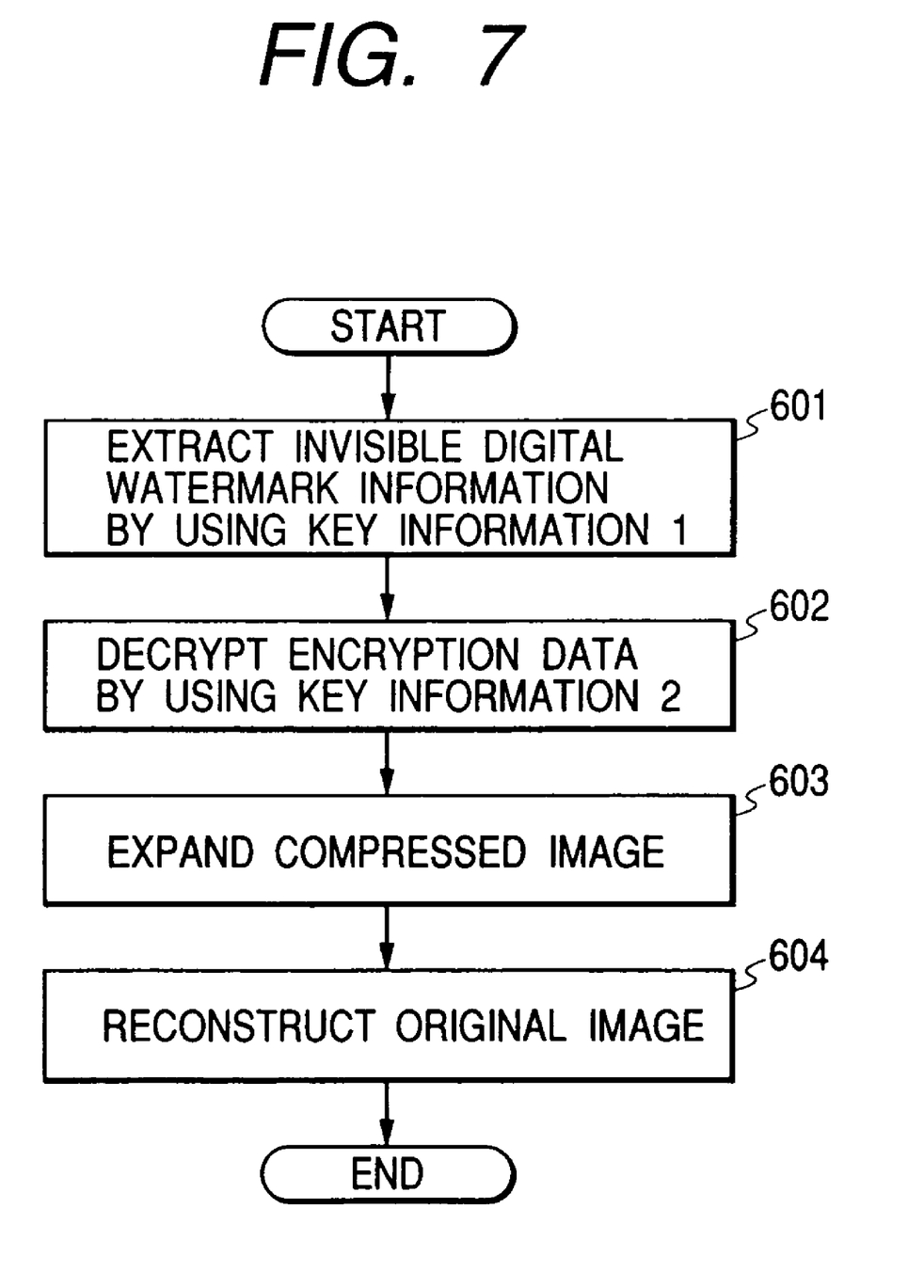
FIG. 7 is a flowchart for explaining an image reconstructing method according to the second embodiment.

FIG. 6 is a flowchart for explaining an embedding process of digital watermark information which is executed by the image processing apparatus according to the embodiment. FIG. 7 is a flowchart for explaining a reconstructing process of the original image corresponding to such an embedding process.

Processes in steps 501 and 502 in FIG. 6 are similar to those in steps 301 and 302 in FIG. 4 shown in the first embodiment and compression image data which is used to reconstruct the original image by those processes is generated.

In step 503, the compression image data is encrypted. This encryption can be realized by a common key encryption such as a DES (Data Encryption Standard) or the like or a public key encryption such as an RSA encryption or the like. In this instance, a specific apparatus or person has to secretly hold a decryption key as key information 2 for decrypting (decoding) the encryption data.

Subsequently, in step 504, the encryption data is embedded as invisible digital watermark information into the lower bit plane of the original image. Since a data length of the encryption data is generally almost equal to that of plain sentence data, the embedding of the invisible digital watermark information in step 504 can be realized by a method similar to that of the embedding of the compression data in step 304.

Finally, in step 505, the visible digital watermark information is embedded in step 505. Since this operation is similar to that in step 304, its description is omitted.

In the reconstructing process of the original image shown in FIG. 7, processes in steps 601, 603, and 604 are similar to those in steps 401 to 403 in FIG. 5 shown in the first embodiment. The invisible digital watermark information which is extracted in step 601, however, is different from the mere compression image data as shown in the first embodiment but the data obtained by encrypting the compression image data. In step 602, therefore, the compression image data is reconstructed by decrypting (decoding) the encryption data by using the key information 2. Further, in step 603, the compression image data is decrypted. In step 604, the original image is reconstructed. Those processes are similar to those in the first embodiment.

Third Embodiment

The invention is not limited to the case of using the visible digital watermark technique as shown in each of the above embodiments. That is, the invisible digital watermark process can be also applied to the visible digital watermark process.

For example, if a method, which will be explained hereinlater, is used, both of "prevention of illegal distribution by the copyright information, user information, or the like" and "perfect reconstruction of the original image" can be also satisfied.

Figure 8:
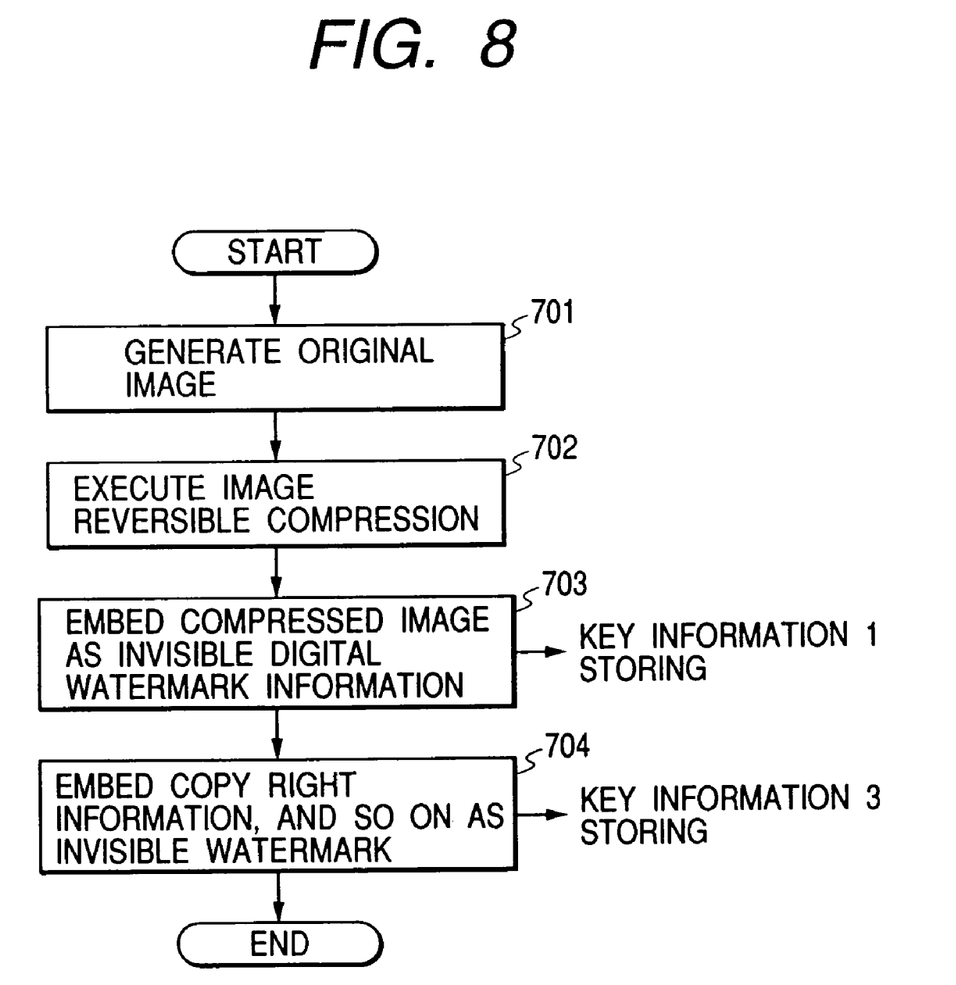
FIG. 8 is a flowchart for explaining an embedding method according to the third embodiment.
Figure 9:
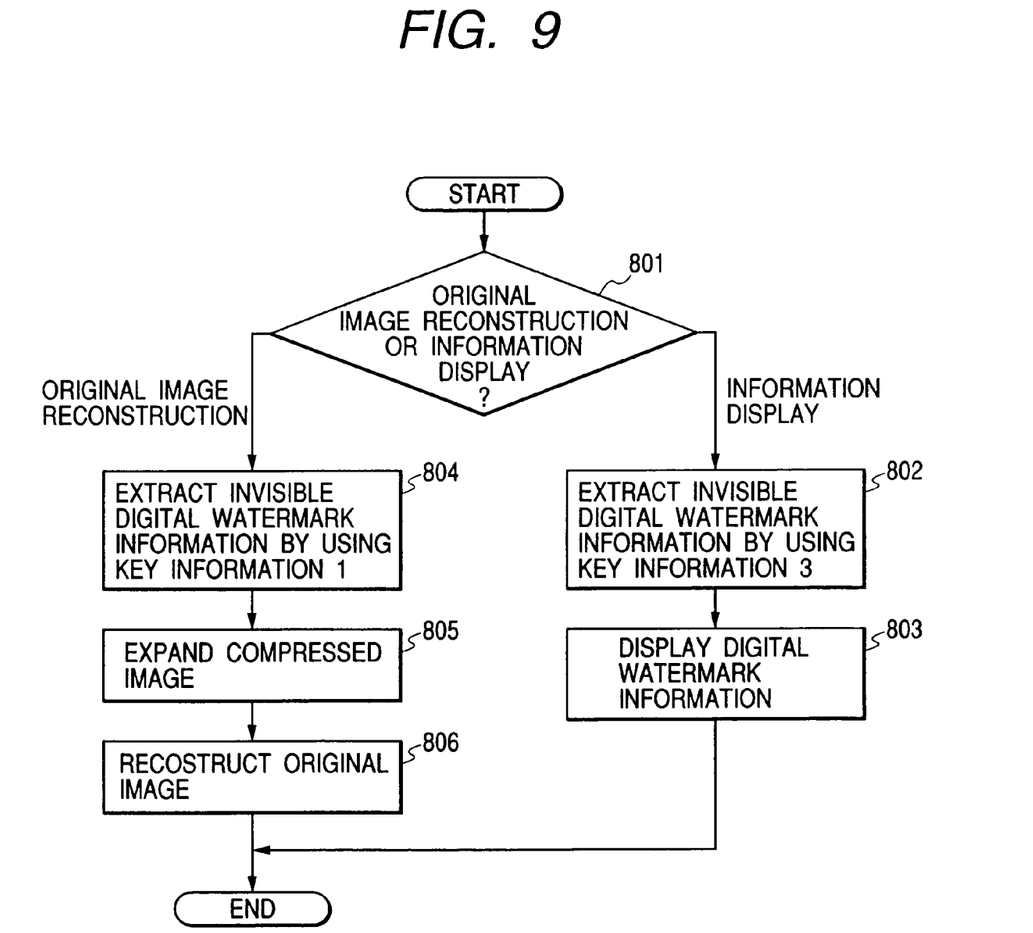
FIG. 9 is a flowchart for explaining an image reconstructing method according to the third embodiment.

FIG. 8 is a flowchart for explaining an embedding process of digital watermark information in the image processing apparatus according to the embodiment. FIG. 9 is a flowchart for explaining a reconstructing process of the original image corresponding to such an embedding process.

In steps 701 in FIG. 8, the original image is generated.

Subsequently, in step 702, the original image is reversibly compressed. In step 703, the obtained compression image data is embedded as invisible digital watermark information into a part of the original image. A specific apparatus or person secretly stores the key information 1 indicative of the embedding position of the compression image data or the like.

In step 704, the copyright information, user information, or the like is embedded as invisible digital watermark information into a part of the original image and a specific apparatus or person secretly stores key information 3 corresponding to it. Specific examples in steps 703 and 704 will be shown below.

In case of using the exchanging method of the bit plane, the compression image data is embedded into the 0-th bit and the copyright information is embedded into the first bit.

In the case where the whole compression image data cannot be embedded into the 0-th bit, the compression image data is also embedded into the first bit, and the copyright information is embedded from the first bit or the second bit subsequently to the compression image data.

In the case where although all of the compression image data can be embedded into the 0-th bit, all of the copyright information cannot be embedded in the first bit, the copyright information is also embedded in the second bit in a manner similar to the above procedure.

As mentioned above, in the case where the embedding of the compression image data and the embedding of the copyright information are realized by the same embedding method, the compression image data and the copyright information are regarded as continuous information.

Subsequently, the case of using different digital watermark methods for the embedding of the compression image data and the embedding of the copyright information will now be described.

For example, a case of expressing the original image by color image data consisting of the RGB components and performing the digital watermark process as mentioned above every component will be considered. In this case, assuming that the embedding target of the compression image data is the B component and the embedding target of the copyright information is the G component, since the embedding targets are different, an arbitrary invisible digital watermark embedding method can be used for each target.

When the original image is reconstructed from the image data obtained by the embedding mentioned above, such a reconstruction can be accomplished by extracting the compression image data from the R component of the image data and extracting the copyright information from the B component.

In the reconstructing process shown in FIG. 9, first, in step 801, the reconstruction of the original image or the display of the digital watermark information such as copyright information or the like is selected.

When the display of the digital watermark information (copyright information or the like) is selected, in step 802, the embedded copyright information, user information, or the like is extracted by using the key information 3. Those information is displayed in step 803.

On the other hand, when the reconstruction of the original image is selected, procedure in steps 804, 805 and 806 is executed by using the key information 1 in a manner similar to the procedure in steps 401 to 403 in the first embodiment, thereby reconstructing the original image.

Although the case of selecting the reconstruction of the original image and the display of the digital watermark information (copyright information or the like) has been described in the embodiment, the invention is not limited to it.

For example, the present method can be also used only to enable the original image to be reconstructed by embedding the compression image data as invisible digital watermark information. In this case, it can be realized by omitting step 704 in FIG. 8 and steps 801 to 803 in FIG. 9.

Although the explanation has been made on the assumption that a reversible compression is preferable as a compressing process of the image in each of the embodiments, if there is no problem in application, an irreversible compressing process such as a JPEG or the like can be applied. For example, in case of applying the irreversible compression in the first embodiment, at least the increase in whole image data amount due to the holding of the key information 1 for reconstructing the visible digital watermark information can be avoided. The contents of all of the bit planes including the m-th bit and the 0-th bit can be reflected into the image data showing the image to be reconstructed, so that the image of a high quality can be reconstructed.

For example, in the case where it is known that the irreversible compressing process such as DCT, JPEG using quantization, or the like will be performed later to the original image, it is not always necessary to execute the reversible compression to the original image as shown in each of the embodiments but the irreversible compression can be also applied.

Even by this method, the compression image data serving as invisible digital watermark information can be set to the image data which sufficiently keeps the feature of the original image on the basis of the relation between the sense of sight and the frequency component or the like. Therefore, in the case where the image is reconstructed from the compression image data, the reconstructed image has a picture quality that is sufficiently close to that of the original image.

Each of the embodiments is not limited to a still image but if the foregoing compressing unit, the digital watermark unit, and the like are prepared, the invention can be applied to various digital data such as sound, motion image, text data, and the like.

That is, in case of applying the invention to the still image mentioned above, the invention is realized by regarding the bit plane or color component as one partial data and allocating the partial data to embed the compression image data and the partial data to embed the copyright information. Therefore, even in case of applying the invention to the various digital data, if a situation such that those digital data can be divided into a plurality of partial data and the compression data obtained by compressing the digital data including the data as an embedding target can be embedded into one of the partial data exists, the invention can be applied.

For example, in case of the sound, the sound data is divided into a plurality of frequency components, the compression data of the whole sound is embedded into the components which are difficult to be identified by the human auditory sense in the obtained plurality of frequency components, and the copyright information or the like is embedded into the components which can be easily identified by the human auditory sense, so that effects similar to those in the foregoing embodiments can be derived. In the motion image, similar processes are possible by dividing it into a plurality of frames and handling each frame as foregoing partial data.

The invention can be applied to a system constructed by a plurality of apparatuses (for example, a host computer, interface equipment, a reader, a printer, and the like) or to an apparatus (for example, a copying apparatus, a facsimile apparatus, or the like) comprising one equipment.

The objects of the invention can be also accomplished by a method whereby a storage medium (or a recording medium) in which program codes of software to realize the functions of the embodiments mentioned above is supplied to a system or an apparatus and a computer (or a CPU or an MPU) of the system or apparatus reads out and executes the program codes stored in the storage medium. In this case, the program codes read out from the storage medium realize the functions of the embodiments mentioned above. The storage medium in which the program codes themselves have been stored constructs the invention. The invention incorporates not only a case where the functions of the embodiments mentioned above are realized by executing the read-out program codes by the computer but also a case where an operating system (OS) or the like which is operating on the computer executes a part or all of the actual processes on the basis of instructions of the program codes and the functions of the embodiments mentioned above are realized by those processes.

Further, the invention also incorporates a case where the program codes read out from the storage medium are written into a memory equipped for a function expanding card inserted in a computer or a memory equipped for a function expanding unit connected to the computer and, thereafter, a CPU or the like equipped for the function expanding card or function expanding unit executes a part or all of the actual processes on the basis of instructions of the program codes and the functions of the embodiments mentioned above are realized by those processes.

As described above, according to the above embodiments, the data amount of the key information can be reduced, the increase in whole data amount due to the holding of the key information can be avoided, or the reversible and safe visible digital watermark information embedding can be realized.

In the invisible digital watermark process, in addition to the display of the information for the ordinary pursue of the illegal distribution, the original image can be also reconstructed.

As described above, according to the invention, in the embedding technique of invisible or visible digital watermark information, the original image can be reconstructed and the increase in whole image data amount due to the holding of the key information can be avoided.

The present invention is not limited to the foregoing embodiments but many modifications and variations are possible within the spirit and scope of the appended claims of the invention.

What is claimed is:

1. An image processing apparatus comprising:
   input means for inputting original image data showing an original image, wherein the original image data is constructed by a plurality of bit planes including a first bit plane and a second bit plane;
   compressing means for lossless-compressing the first bit plane and the second bit plane so that, in a case where the compressed first bit plane and the compressed second bit plane are composited, an amount of composite compressed data is smaller than a data amount of one uncompressed bit plane;
   data compositing means for compositing the compressed first bit plane and the compressed second bit plane to generate the composite compressed data;

first substituting means for substituting the composite compressed data for the uncompressed first bit plane of the original image data; and second substituting means for substituting additional information for the uncompressed second bit plane of the original image data.

2. An apparatus according to claim 1, wherein the first predetermined bit plane is a lower bit plane.

3. An apparatus according to claim 1, wherein said compressing means compresses the data of the first predetermined bit plane and data of a second predetermined bit plane of the original image data, and said apparatus further comprises second embedding means for embedding additional information into the second predetermined bit plane.

4. An apparatus according to claim 3, wherein the second predetermined bit plane is an upper bit plane.

5. An apparatus according to claim 1, wherein said original image data comprises color components of RGB.

6. An apparatus according to claim 1, wherein the compression by the compressing means is reversible compression.

7. An apparatus according to claim 1, wherein the first embedding means embeds the data as an invisible watermark.

8. An image processing method comprising:

an input step of inputting original image data representing an original image, wherein the original image data is constructed by a plurality of bit planes including a first bit plane and a second bit plane;

a compressing step of lossless-compressing the first bit plane and the second bit plane so that, in a case where the compressed first bit plane and the compressed second bit plane are composited, an amount of composite compressed data is smaller than a data amount of one uncompressed bit plane;

a data compositing step of compositing the compressed first bit plane and the compressed second bit plane to generate the composite compressed data;

a first substituting step of substituting the composite compressed data for the uncompressed first bit plane of the original image data; and a second substituting step of substituting additional information for the uncompressed second bit plane of the original image data.

9. A storage medium which stores an image processing program so that it can be read out by a computer, wherein said program comprises:

an input step of inputting original image data showing an original image, wherein the original image data is constructed by a plurality of it planes including a first bit plane and a second bit plane;

a compressing step of lossless-compressing the first bit plane and the second bit plane so that, in a case where the compressed first bit plane and the compressed second bit plane are composited, an amount of composite compressed data is smaller than a data amount of one uncompressed bit plane;

a data compositing step of compositing the compressed first bit plane and the compressed second bit plane to generate the composite compressed data;

a first substituting step of substituting the composite compressed data for the uncompressed first bit plane of the original image data; and a second substituting step of substituting additional information for the uncompressed second bit plane of the original image data.

* * * * *